United States Patent
Rezaiifar et al.

(10) Patent No.: US 6,996,127 B2
(45) Date of Patent: Feb. 7, 2006

(54) METHOD AND APPARATUS FOR DISTRIBUTED OPTIMAL REVERSE LINK SCHEDULING OF RESOURCES, SUCH AS RATE AND POWER, IN A WIRELESS COMMUNICATION SYSTEM

(75) Inventors: Ramin Rezaiifar, San Diego, CA (US); Jack Holtzman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 17 days.

(21) Appl. No.: 10/447,330

(22) Filed: May 28, 2003

(65) Prior Publication Data

US 2003/0193907 A1 Oct. 16, 2003

Related U.S. Application Data

(63) Continuation of application No. 09/151,391, filed on Sep. 10, 1998, now Pat. No. 6,597,705.

(51) Int. Cl.
*H04J 3/16* (2006.01)
*H04J 3/26* (2006.01)
*H04L 12/28* (2006.01)
*H04B 7/185* (2006.01)
*H04B 17/02* (2006.01)

(52) U.S. Cl. .................. 370/468; 370/432; 370/395.41; 370/318; 455/134; 455/13.4

(58) Field of Classification Search ................ 370/468, 370/318, 328, 329, 332, 389, 395.41, 395.21, 370/432, 410, 335, 441, 333, 444, 348; 455/436, 455/13.4, 134, 68, 452, 437, 442, 450, 63, 455/67.3

See application file for complete search history.

(56) References Cited

U.S. PATENT DOCUMENTS

| | | | | | |
|---|---|---|---|---|---|
| 5,583,869 | A | * | 12/1996 | Glube et al. ................ | 370/347 |
| 5,745,480 | A | * | 4/1998 | Behtash et al. ............. | 370/252 |
| 6,069,883 | A | * | 5/2000 | Ejzak et al. ................ | 370/335 |
| 6,088,335 | A | * | 7/2000 | I et al. ........................ | 370/468 |
| 6,088,578 | A | * | 7/2000 | Manning et al. ............. | 455/68 |
| 6,314,084 | B1 | * | 11/2001 | Kahale et al. ............... | 370/230 |
| 6,418,148 | B1 | * | 7/2002 | Kumar et al. ............... | 370/468 |
| 6,597,705 | B1 | * | 7/2003 | Rezaiifar et al. ........... | 370/468 |

* cited by examiner

*Primary Examiner*—Hanh Nguyen
(74) *Attorney, Agent, or Firm*—Philip Wadsworth; Sandra L. Godsey; Thien T. Nguyen

(57) ABSTRACT

A method, and corresponding apparatus, applies to individual base stations in a wireless communications systems, where each base station performs rate assignment to mobile stations optimally, but independently of the other base stations. Different base stations affect each other through other cell interference, and continuously modify their reversed link rate assignment based on the other-cell interference received and the requested rates from the mobile stations. The base stations converge to a stable condition with uncoordinated optimizations. The optimizing technique maximizes total through put in each cell (maximizing rates) while maintaining interference to other cells at a minimum level, and being subject to at least some of the following constraints: mobile station's maximum transmit power, mobile station's requested rate, discrete set of possible rates, maximum rise-over-thermal interference at the base station, and minimum required received error per bit normalized for noise.

25 Claims, 5 Drawing Sheets

METHOD AND APPARATUS FOR DISTRIBUTED OPTIMAL REVERSE LINK SCHEDULING OF RESOURCES, SUCH AS RATE AND POWER, IN A WIRELESS COMMUNICATION SYSTEM

CLAIM OF PRIORITY UNDER 35 U.S.C. §120

The present Application for Patent is a Continuation and claims priority to patent application Ser. No. 09/151,391 entitled "METHOD AND APPARATUS FOR DISTRIBUTED OPTIMAL REVERSE LINK SCHEDULING OF RESOURCES, SUCH AS RATE AND POWER, IN A WIRELESS COMMUNICATION SYSTEM" filed Sep. 10, 1998, now issued U.S. Pat. No. 6,597,705, issued Jul. 22, 2003 to Rezaiifar et al., and assigned to the assignee hereof and hereby expressly incorporated by reference herein.

BACKGROUND

1. Field

The invention relates to communication systems. More particularly, the invention relates to methods and apparatus for scheduling or assigning resources such as rate and power in a wireless communication system.

2. Background

Several multiple access communication techniques are known in the art, such as time division multiple access (TDMA) and frequency division multiple access (FDMA). However, the spread spectrum modulation techniques of code division multiple access (CDMA) provide significant advantages over other multiple access modulation techniques. CDMA techniques in a communication system are disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING SIGNAL WAVEFORMS IN A CDMA CELLULAR TELEPHONE SYSTEM," both assigned to the assignee of the present invention.

Since CDMA employs a wideband signal, it spreads the signal energy over a wide bandwidth. Therefore, frequency selective fading affects only a small part of the CDMA signal bandwidth. CDMA also provides space or path diversity through multiple signal paths that simultaneously link a mobile station or user with two or more cell-sites. Furthermore, CDMA can exploit the multipath environment by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention.

CDMA modulation techniques require that all transmitters be under precise power control to manage interference in the system. If the transmission power of signals transmitted by a base station to a user (the forward link) are too high, it can create problems such as interfering with other users. Most base stations have a fixed amount of power at which to transmit signals, and therefore can transmit to only a limited number of users. Alternatively, if the transmission power of signals transmitted by the base station is too low, then some users can receive multiple erroneous transmitted frames. Terrestrial channel fading and other known factors also affect the transmission power of signals transmitted by the base station. Thus, each base station needs to adjust the transmission power of the signals it transmits to its users. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention.

Under one CDMA standard, described in the Telecommunications Industry Association's *TIA/EIA/IS-95-A Mobile Stations-Base Station Compatibility Standard for Dual-Mode Wideband Spread Spectrum Cellular System*, each base station transmits pilot, sync, paging and forward traffic channels to its users. Under this standard, power control signals or codes are also exchanged between each base station and the mobile stations to provide appropriate power control for the system.

Improvements to the above standard have included additional, higher data rates. These higher data rates help provide for data services beyond traditional voice services. Voice services typically tolerate higher error rates than data services (e.g., a maximum bit error rate (BER) of $10^{-3}$), but require continuous bit stream transmissions with no delays. Most data, such as electronic mail, facsimile and general computer data, may use discontinuous, packetized data transmissions. Such data typically must be transmitted at bit rates higher than speech, but are insensitive to delay and require lower error rates. For example, facsimile, general computer data and email typically are transmitted at bit rates of 8–32 kbps, 0.1–1 Mbps, and 9.6–128 kbps, and maximum BER's of $10^{-4}$, $10^{-9}$ and $10^{-9}$, all respectively. Video requires even higher bit rates and lower error rates than voice, and, like voice, requires continuous bit stream transmissions. For example, low resolution video typically requires a bit rate of 64–128 kbps and a maximum BER of $10^{-5}$.

To be efficient, a wireless communication system must not provide the same data rate, error rate and bit stream (power) for all services based on the most stringent requirements of any one service. Therefore, one prior technique employs dynamic control algorithms for admission or registration control, resource allocation and error recovery and at burst or packet levels for a given base station. See, e.g., A. Sampath, P. Kumar and J. Holtzman, "Power Control and Resource Management for a Multimedia CDMA Wireless System," PIMRC, 1995. Such a system, however, may provide ad hoc or immediate service allocation, which is not efficient or optimized. Each new service request is allocated at that time by the base station. Additionally, while one base station may optimize itself for an immediate service allocation, such optimizations may well create interference for adjacent base stations. If one base station is optimizing itself, interference it receives from an adjacent base station, (which is itself optimizing) can cause two adjacent base stations to continually create interference for each other and thereby result in an unstable condition within the wireless communication system.

SUMMARY

One solution to the possible problem of interference between base stations or cell sites during resource optimization, such as rate and power optimization, is to employ a central processor or selector that synchronously controls each cell. A centralized controller, however, requires complex computations for each cell, and the computational burden grows exponentially with each additional cell. Moreover, a centralized controller requires information to be transmitted between base stations, as well as to the centralized controller. Furthermore, such a centralized controller may require that all base stations perform interference measurement and rate assignment synchronously, thereby further increasing the complexity of such a centralized approach.

The inventors have developed a technique where each base station performs the rate assignment optimally but independently of the other base stations. Different base stations affect each other through other cell interference, and continuously modify their reverse link rate assignment based on the other-cell interference received and the requested rates from the mobile stations. Under the inventors' technique, the base stations converge to a stable condition with uncoordinated optimizations (i.e., without a central processor).

Under one embodiment of the invention, a distributed reverse link rate assignment technique assigns reverse link rates optimally within each cell, while also maintaining interference to other cells at a minimum level. The optimization technique maximizes the total throughput in each cell subject to a set of constraints, such as the following constraints: mobile station's maximum transmit power, mobile station's requested rate, discrete set of possible rates, maximum rise-over-thermal interference at the base station, and a minimum required received energy per bit normalized for noise ($E_b/N_0$).

Each base station assigns rates in such a way that minimizes other-cell interference by assigning higher rates to mobile stations closer to the center of the cell, and lower rates to mobile stations further from the center of the cell.

In a broad sense, one aspect of the invention embodies a communications system having at least first and second base stations exchanging communication signals with at least first and second user stations, respectively. A method under the communication system includes: (a) receiving transmission requests from the first and second user stations, respectively, and scheduling requests received from other user stations, wherein the first base station optimizes the scheduling independently of the scheduling of the second base station and minimizes interference with the second base station, and vice-versa, and (b) transmitting first and second assignment signals to the first and second user stations respectively, wherein the assignment signals specify at least one transmission criteria at which the user stations are to transmit data.

BRIEF DESCRIPTION OF THE DRAWINGS

In the figures, like reference numbers identify similar elements. For ease in identifying the discussion of any particular element, the most significant digit in a reference number refers to the figure number in which that element is first introduced (e.g., element 204 is first introduced and discussed with respect to FIG. 2).

DETAILED DESCRIPTION

A communication system, and in particular, an apparatus and method for controlling resources, such as rate and power, and reducing signal interference in the system, is described in detail herein. In the following description, numerous specific details are provided to give a thorough understanding of the invention. One skilled in the relevant art, however, will readily recognize that the invention can be practiced without these specific details, or with alternative elements or steps. In other instances, well-known structures and methods are not shown in detail to avoid obscuring the invention.

Figure 1:
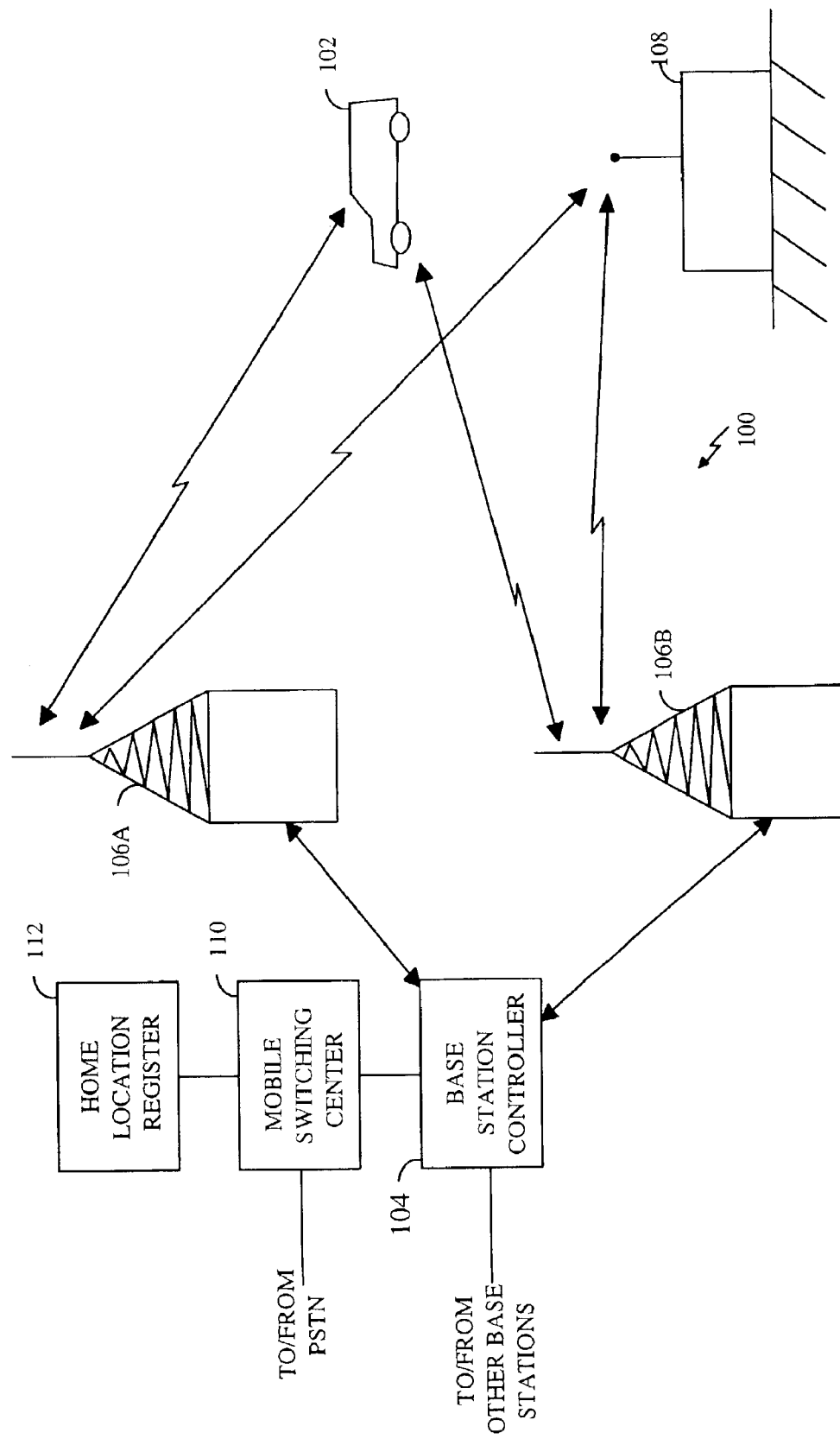
FIG. 1 illustrates a wireless communications system employing the invention.

FIG. 1 illustrates an exemplary cellular subscriber communication system 100, which uses multiple access techniques such as CDMA for communicating between users of user stations (e.g., mobile telephones) and cell-sites or base stations. In FIG. 1, a mobile user station 102 communicates with a base station controller 104 by means of one or more base stations 106a, 106b, etc. Similarly, a fixed user station 108 communicates with the base station controller 104, but by means of only one or more predetermined and proximate base stations, such as the base stations 106a and 106b.

The base station controller 104 is coupled to and typically includes interface and processing circuitry for providing system control to the base stations 106a and 106b. The base station controller 104 may also be coupled to and communicate with other base stations, and possibly even other base station controllers. The base station controller 104 is coupled to a mobile switching center 110, which in turn is coupled to a home location register 112. During registration of each user station at the beginning of each call, the base station controller 104 and the mobile switching center 110 compare registration signals received from the user stations to data contained in the home location register 112, as is known in the art. Soft handoffs may occur between the base station controller 104 and other base station controllers, and even between the mobile switching center 110 and other mobile switching centers, as is known by those skilled in the art.

When the system 100 processes voice or data traffic calls, the base station controller 104 establishes, maintains and terminates the wireless link with the mobile station 102 and the fixed station 108, while the mobile switching center 110 establishes, maintains and terminates communications with a public switched telephone network (PSTN). While the discussion below focuses on signals transmitted between the base station 106a and the mobile station 102, those skilled in the art will recognize that the discussion equally applies to other base stations, and to the fixed station 108. The terms "cell" and "base station" are generally used interchangeably herein.

Figure 2:
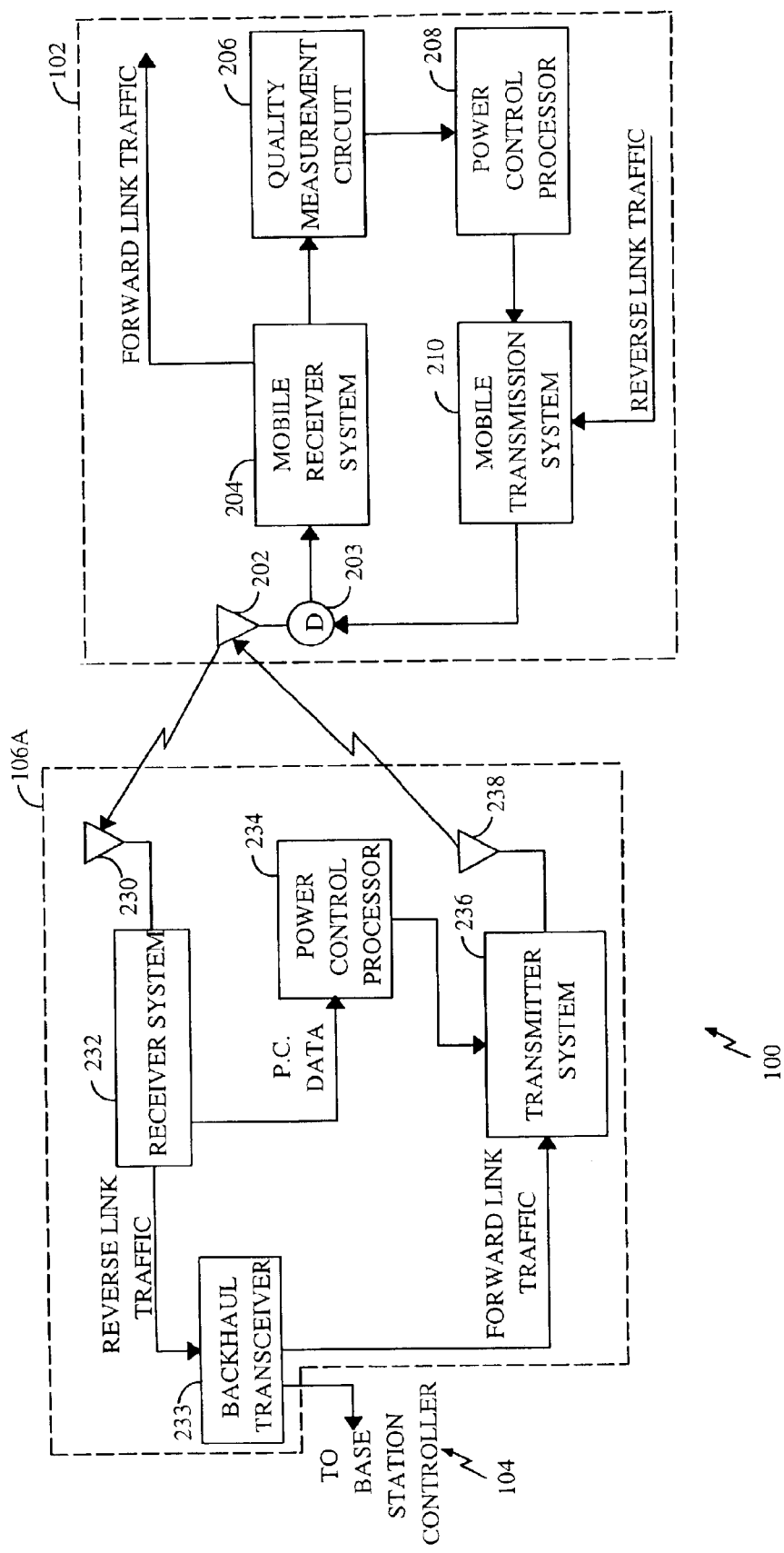
FIG. 2 is a block diagram of a power control system for use in the wireless communication system of FIG. 1.

Referring to FIG. 2, the mobile station 120 includes an antenna 202 that transmits signals to, and receives signals from the base station 106a. A duplexer 203 provides a forward link channel or signal from the base station 106a to a mobile receiver system 204. The mobile receiver system 204 down-converts, demodulates and decodes the received signal. The mobile receiver system 204 then provides a predetermined parameter or set of parameters to a quality measurement circuit 206. Examples of parameters might include measured signal to noise ratio (SNR), measured received power, or decoder parameters such as symbol error rate, Yamamoto metric, or parity bit check indication. Additional details regarding operation of the mobile station 102 (and the base station 106a) are found, for example, in U.S. Pat. No. 5,751,725, entitled "METHOD AND APPARATUS FOR DETERMINING THE RATE OF RECEIVED DATA IN A VARIABLE RATE COMMUNICATION SYSTEM," assigned to the assignee of the present invention, and incorporated by reference herein.

The quality measurement circuit 206 receives the parameters from the mobile receiver system 204 and determines a quality measurement signal or power level of the received signal. The quality measurement circuit 206 can generate energy per bit ($E_b$) or energy per symbol ($E_s$) measurements from portions or windows of each frame. Preferably, the energy per bit or energy per symbol measurements are normalized (e.g., $E_b/N_o$), or normalized and include interference factors (e.g., $E_b/N_t$), as is known in the art. Based on these measurements, the quality measurement circuit 206 produces a power level signal.

A power control processor 208 receives the power level signal from the quality measurement circuit 206, compares the signal to a threshold and produces a power control message based on the comparison. Each power control message can indicate a change in power for the forward link signal. Alternatively, power control processor 208 produces power control messages representing the absolute power of the received forward link signal, as is known in the art. The power control processor 208 produces preferably several (e.g., sixteen) power control messages in response to several power level signals per frame. While the quality measurement circuit 206 and power control processor 208 are generally described herein as separate components, such components can be monolithically integrated, or the operations performed by such components can be performed by a single microprocessor.

A mobile transmission system 210 encodes, modulates, amplifies and up converts the power control messages via the duplexer 203 and the antenna 202. In the illustrated embodiment, the mobile transmission system 210 provides the power control message in a predetermined location of an outgoing reverse link frame.

The mobile transmission system 210 also receives reverse link traffic data, such as voice or general computer data, from the user of the mobile station. The mobile transmission system 210 requests a particular service (including power/rate) from the base station 106a based on the traffic data to be transmitted. In particular, the mobile transmission system 210 requests bandwidth allocation appropriate for the particular service. As explained more fully below, the base station 106a then schedules or allocates bandwidth (power/rate) resources based on the request from the mobile station 102 and other users to optimize such resource allocation.

The base station 106a includes a receiving antenna 230 that receives the reverse link frames from the mobile station 102. A receiver system 232 of the base station 106a down converts, amplifies, demodulates and decodes the reverse link traffic. A backhaul transceiver 233 receives and forwards to the base station controller 104 reverse link traffic. The receiver system 232 also separates the power control messages from each reverse link traffic frame and provides the power control messages to a power control processor 234.

The power control processor 234 monitors the power control messages and produces a forward link transmitter power signal to a forward link transmitter system 236. The forward link transmitter system 236, in response thereto, either increases, maintains, or decreases the power of the forward link signal. The forward link signal is then transmitted via a transmitting antenna 238. Additionally, the power control processor 234 analyzes the quality of the reverse link signal from the mobile station 102 and provides appropriate feedback control messages to the forward link transmitter system 236. The forward link transmitter system 236, in response thereto, transmits the feedback control messages via the transmitting antenna 238 over the forward link channel to the mobile station 102. The transmitter system 236 also receives forward link traffic data from the base station controller 104 via the backhaul transceiver 233. The forward link transmitter system 236 encodes, modulates and transmits, via the antenna 238, the forward link traffic data.

Unless described otherwise herein, the construction and operation of the various blocks and elements shown in FIGS. 1, 2 and the other figures are of conventional design and operation. Thus, such blocks or elements need not be described in further detail, because they will be understood by those skilled in the relevant art. Any additional description is omitted for brevity and to avoid obscuring the detailed description of the invention. Any modifications necessary to the blocks of the communication system 100 of FIG. 1, FIG. 2, or other systems can be readily made by one skilled in the relevant art based on the detailed description provided herein.

The closed-loop power control system for mobile stations, including the mobile station 102, and base station 106a dynamically adjusts the transmit power for each user based on the user's propagation conditions to yield the same frame error rate (FER) for each user for voice services (e.g., a 1% FER). As noted above, many users, however, may request transmission for data services, in lieu of voice services, such as facsimile, e-mail and general computer data, all of which are insensitive to delay, but require a lower FER (or lower bit error rate (BER)). A user may even require video services, which not only require a lower FER, but are sensitive to delay. More importantly, video requires a higher transmission rate over voice. As described more fully herein, the base station 106a dynamically assigns transmission rates based on requests from each user.

Speech services need not necessarily have a high bit rate, but typically must have a continuous bit stream. In contrast, general computer data and e-mail services require higher bit rates, but may readily employ bursts or packets of data. To accommodate bursts at high bit rates, the base station 106a must schedule transmissions so that the total interference with all users of that base station are not excessive. Such scheduling and control is possible because these data services are delay tolerant and thus their transmissions can be scheduled. For CDMA systems, such as the system 100, considerable performance gains are obtained by scheduling data transmissions concurrently with or around voice transmissions. The base station 106a can control the transmission rate of each burst or each packet for optimization. The transmission rate of each burst or packet is limited by the amount of interference the transmission will cause to both the base station's own cell and to the immediately neighboring cells (e.g., to the base station 106a, and its neighboring base station 106b).

The base station 106a begins a resource allocation routine by initially distinguishing differing services. Services are distinguished based on, for example, quality of service (QoS) requirements such as minimum tolerable bit-error rate (BER), FER, or signal-to-interference ratio (SIR). The base station 106*a* also characterizes services based on power and rate requirements, such as maximum power and/or minimum bit-rate constraints. For example, if the mobile station 102 requests services for transmitting short data messages, the mobile station may have very tight power limits due to small battery size, but very loose delay constraints (i.e., low bit-rate requirements). On the other hand, if the mobile 102 requests voice services, it may have strict rate requirements compared to power or bit-error rates, vis-à-vis data services. If the mobile station 102 requests video services, it may require high bit rates and low error rates and be intolerant to delays.

As noted above, the transmit power for the mobile station 102 is controllable, and the transmission rate may likewise be controllable. Under the CDMA system 100 of FIG. 2, the interference seen by the mobile station 102 is a function of the transmit powers of interfering users for the base station 106*a* (and other base stations). The interference level, however, also depends on all other users' bit-rates. A smaller bit rate requirement implies lower transmit power to obtain the same quality. Thus, the problem of achieving each user's QoS requirement is directly related to the powers and the bit rates for all users. Indeed, the bandwidth, power and rate resources are all directly linked. Therefore, to achieve desired performance for all users, the base station 106*a* must manage the transmit power on bit-rate assignments for its users.

Mathematically, the optimum rate that the base station 106*a* should assign to each of its mobile stations is determined by independently solving the following optimization function:

$$\max_{R} \sum_{i=1}^{N} R_i, \quad (1)$$

subject to:

$$(E_b/I_0)_i = \gamma_i, \ i=1, \ldots, N \quad (2)$$

$$R_{min_i} \leq R_i \leq R_{max_i}, \ i=1, \ldots, N \quad (3)$$

$$P_i \leq P_{max_i}, \ i=1, \ldots, N \quad (4)$$

where N is the number of mobile stations controlled by the base station 106*a* and $\gamma_i$ is the target $E_b/N_0$ for the $i^{th}$ mobile station (e.g., 5 dB for voice and 5–12 dB for data, depending upon data rate). (The base station 106*a* maps $E_b/N_0$ directly to a mobile station's QoS, e.g., BER). Under equation (1), R is a vector consisting of all component transmission rates $R_i$ (R=[$R_1, R_2, \ldots R_N$]). The base station 106*a* under (1) picks the set of rates $\{R_i\}$ so as to maximize the sum of $R_i$'s subject to the conditions under equations (2) through (4), for all users N in the cell. Under equation (2), $E_b/I_0$ corresponds to the energy-per-bit to total interference density ratio. Under (3), $R_i$ is the rate for the $i^{th}$ mobile station, which lies between the minimum and maximum rates $R_{min_i}$ and $R_{max_i}$, respectively, in the vector R. Under equation (4), $P_i$ corresponds to the transmit power by the ith mobile station.

In a more general setting, a weighted sum of the rates, $$\max_{R} \sum_{i=1}^{N} R_i,$$

can be maximized. In this way, certain mobile stations (the ones with larger $$\max_{R} \sum_{i=1}^{N} R_i$$

can be treated more favorably in the sense that they will be assigned higher rates. The coefficients $$\max_{R} \sum_{i=1}^{N} R_i$$

can then be used by the base station as a mechanism to achieve Quality of Service (QoS).

Figure 3:
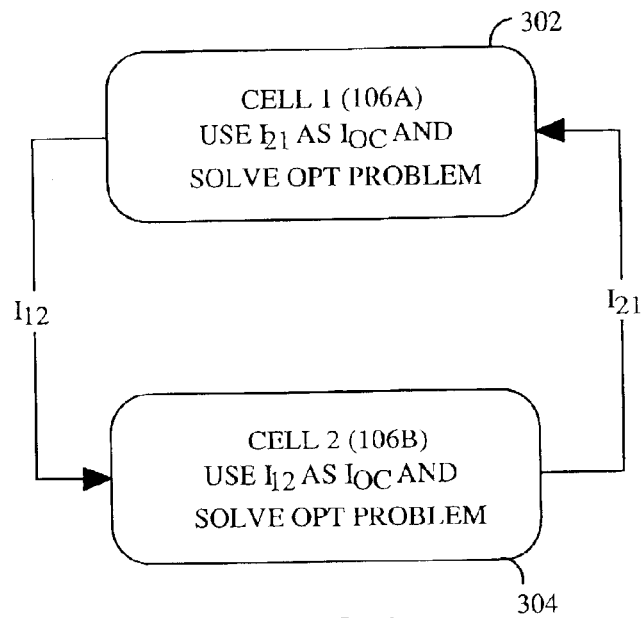
FIG. 3 is a flow diagram showing distributed rate assignment between two base stations of two cells.

After finding the optimal rate assignment for a cell, a new set of interferences from one cell to another results, which is used in the next iteration round. Referring to FIG. 3, the base station 106*a* is shown as being located in cell 1, and compensates for interference caused by the base station 106*b* in cell 2. Similarly, the base station 106*b* compensates for distortion created by the base station 106*a*. FIG. 3 corresponds to the special case where only two cells interact. In FIG. 3, $I_{ij}$ is the interference caused by cell j to cell i.

The individual cell optimization problem (e.g., just for the base station 106*a*) can be approximated by the following linear programming problem:

$$\max_{P} \sum_{i=1}^{N} h_i P_i, \quad (5)$$

subject to:

$$A_{min} P \geq (I_{oc} + N_0) W \mathbf{1} \quad (6)$$

$$A_{max} P \leq (I_{oc} + N_0) W \mathbf{1} \quad (7)$$

$$P_i \leq P_{max_i}, \ i=1, \ldots, N, \quad (8)$$

and where 1 is the vector of all ones of size N,

N is the number of mobile stations in the cell, $I_{oc}$ is the interference that the base station receives from other cells, W is the bandwidth of the system (e.g., 1.25 MHz), $N_O$ is the Additive White Gaussian Noise (AWGN) density (e.g., $10^{-6}$), $h_i$ is the channel gain (path loss) from the $i^{th}$ mobile station to the base station (e.g. 0.25), and $A_{min}$ and $A_{max}$ are N×N matrices defined by:

$$A_{min} = \begin{bmatrix} \frac{W h_1}{R_{min_1} \gamma_1} & -h_2 & \cdots & -h_N \\ -h_1 & \frac{W h_2}{R_{min_2} \gamma_2} & \cdots & -h_N \\ \vdots & \vdots & \vdots & \vdots \\ -h_1 & -h_2 & \cdots & \frac{W h_N}{R_{min_N} \gamma_N} \end{bmatrix} \quad (9)$$

-continued $$A_{max} = \begin{bmatrix} \frac{Wh_1}{R_{max_1}\gamma_1} & -h_2 & \cdots & -h_N \\ -h_1 & \frac{Wh_2}{R_{max_2}\gamma_2} & \cdots & -h_N \\ \vdots & \vdots & \vdots & \vdots \\ -h_1 & -h_2 & \cdots & \frac{Wh_N}{R_{max_N}\gamma_N} \end{bmatrix} \quad (10)$$

Performing the optimal rate assignment as explained above in each cell leads to a stable system in the sense that the interference generated by each cell converges to a fixed value. Mathematically, under the convergence theorem, initially, let $I \in \Re^{N \times N}$ and $f: \Re^{N \times N} \rightarrow \Re^{N \times N}$ be a mapping that satisfies the following conditions for all $I \geq 0$:

Positivity: $f(I) > 0$;

Monotonicity: If $I > I'$, then $f(I) \geq f(I')$;

Scalability: For all $\alpha > 1$, $\alpha f(I) > f(\alpha I)$.

where all the matrix inequalities are interpreted as component-by-component inequalities. A mapping f that satisfies the above three conditions has been called standard. 'See R.A. Yates, "A Framework for Uplink Power Control in Cellular Radio Systems," *Journal on Selected Areas in Communications* 13(7):1341–1347, September 1995.

Then, for a standard mapping f with a, the iteration:

$$I^{(n+1)} = f(I^{(n)}) \quad (11)$$

converges to a unique fixed point of the mapping f for all initial conditions I(0), assuming that the mapping f has a fixed point.

Now, applying the convergence theorem and equations (5) through (8) of individual cell optimization to a multicell environment, it can be shown that the multicell environment likewise converges to a unique fixed point. Initially, let the matrix $I = [I_{ij}]$ be the interference matrix such that $I_{ij}$ is the interference caused by cell j to cell i. Note that by definition, $I_{ii}$ is zero. Therefore, the total interference to cell i from the other cells, $I_{oci}$, can be written as:

$$I_{oci} = \sum_j I_{ij} \quad (12)$$

Also, let $f_j: IR^{N \times N} \rightarrow IR^N$ to be a mapping such that, given the interference matrix I, generates the interference from cell j to other cells, $I_j$, by solving the following optimization problem:

$$\max_{P_j} \sum_{k=1}^{N} h_{jk} P_{jk}, \quad (13)$$

subject to:

$$A_{min_j} P_j \geq (I_{ocj} + N_0) W \mathbf{1} \quad (14)$$

$$A_{max_j} P_j \leq (I_{ocj} + N_0) W \mathbf{1} \quad (15)$$

$$P_{jk} \geq 0, \, k=1, \ldots, N \quad (16)$$

Again, $h_{jk}$ is the channel gain from a mobile station k to a base station j. For example, given $P_j = \{P_{j1}, \ldots, P_{jN}\}$, the interference from cell j to cell i, $I_{ij}$, is $\Sigma_{k=1}^{N} P_{jk} h_{ik}$.

Figure 4:
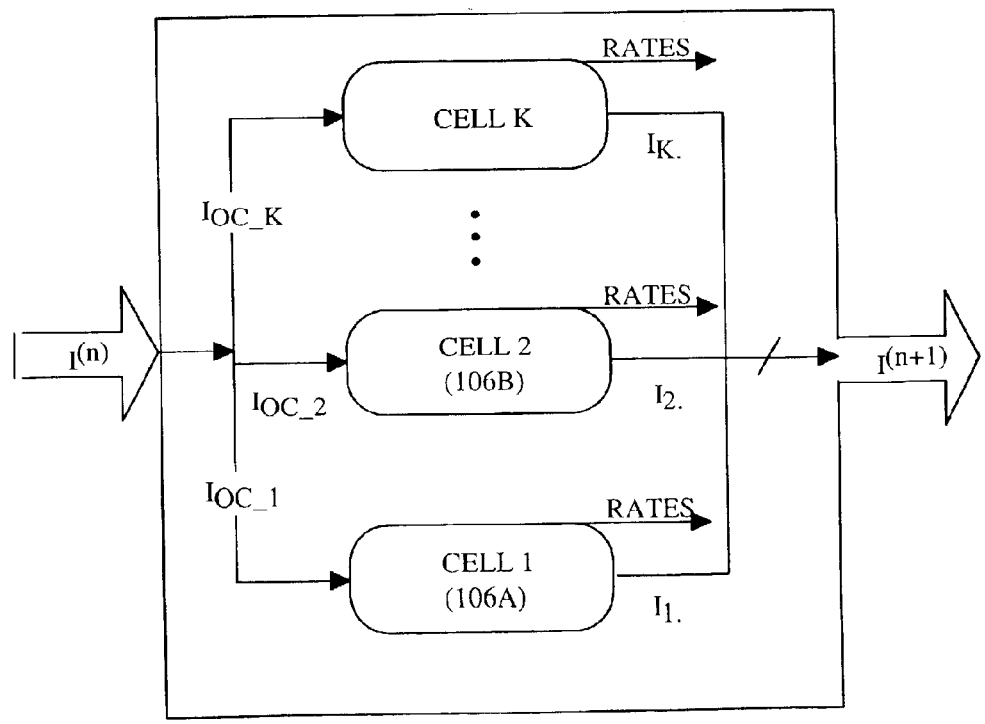
FIG. 4 is a flow diagram showing distributed rate assignment with greater than two base stations and associated cells.

Referring to FIG. 4, the two cell case of FIG. 3 is expanded to k number of cells. Each cell 1 through k (including base stations 106a and 106b) determines an interference value of other cells for that cell (e.g., $I_{OC\_1}$ for cell 1 (base station 106a)). In FIG. 4, an interference vector $I_j$ represents interference generated by cell j to other cells (where j equals 1, 2, ..., k). The $k^{th}$ entry of this vector is the interference generated by cell j to cell k.

The cells then generate rates and corresponding interference values I(n+1), which are then iteratively fed back to each cell as interference values I(n). At each iteration the other cell interference from the previous step is used to compute the new set of reverse link rates at each cell. This new set of rates creates the other cell interference for the next iteration. The cells synchronously adjust under standard synchronism (e.g., frame synchronism under known CDMA techniques). As each cell optimizes its rates and compensates for interference of other cells (based on rates they set), the optimization of each cell converges to a stable condition, rather than escalating to an unstable condition, as explained herein. Each cell need not exchange information with the other cells and each cell need not optimize itself synchronously with other cells, for the system 100 to converge to a stable, optimal condition. Each base station forms its optimization independently, without any knowledge of the powers and rates assigned by other base stations to their users.

It can be shown that, under the above equations (including equation (13)), the mapping f is standard (i.e., satisfies the positivity, monotonicity and scalability conditions). The positivity condition is proven by contradiction. Let vector $P_j$ be a solution to (13) for some $I \geq 0$, where by definition of f, we have $P_j \geq 0$. Without loss of generality, suppose $p_j$ is zero. Equation (14) in the set of constraints for equation (13) reduces to:

$$-h_{j2} p_{j2} - \ldots - h_{jN} p_{jN} \geq (I_{ocj} + N_0) W. \quad (17)$$

The left-hand side of equation (17) is non-positive, while the right-hand side is strictly positive (since $N_0 > 0$). Therefore, (17) is impossible and by contradiction, $p_{jk} > 0$, $k=1, \ldots, N$. This implies that $I_{ij} = \Sigma_{k=1}^{N} P_{jk} h_{ki}$ is strictly positive for all i.

The monotonicity condition is proven by first letting p* and p'* be solutions to (13) with $I_{ocj} = I_{oc}$ and $I_{ocj} = I'_{oc}$, respectively. It can be easily seen that:

$$P'^* = P^* \frac{I'_{oc} + N_0}{I_{oc} + N_0} \quad (18)$$

If $I' > I$, then $I'_{oc} \leq I_{oc}$, and from equation (18) it follows that $P'^* > P^*$. By applying this argument to all cells, we get $f(I') > f(I)$ which proves the monotonicity condition.

The scalability condition is proven by first letting $p_I$ and $p_{\alpha I}$ be solutions to (13) with $I_{ocj} = I_{oc}$ and $I_{ocj} = \alpha I_{oc}$, respectively. Again, it can be shown that:

$$P_{\alpha I} = P_I \frac{\alpha I_{oc} + N_0}{I_{oc} + N_0} < \alpha P_I \quad (19)$$

Equation (19) results from the assumption that $\alpha > 1$. From equation (19), and by repeating the same argument for all the cells, then $f(\alpha I) < \alpha f(I)$.

Notice that (13) does not include the maximum transmit power constraint which is present equation in (5). To extend the proof of convergence to the case that this constraint is included, it is first noted that if the mapping f is standard, then the following iteration converges to a unique fixed point for all initial conditions.

$$\hat{I}^{(n+1)} = \min\{f(\hat{I}^{(n)}), I_{max}\} \quad (20)$$

Using the above result, and noting that $I_{max}$ constraint directly maps to the maximum transmit power constraint, the distributed rate assignment routine converges for all the initial conditions.

Figure 5:
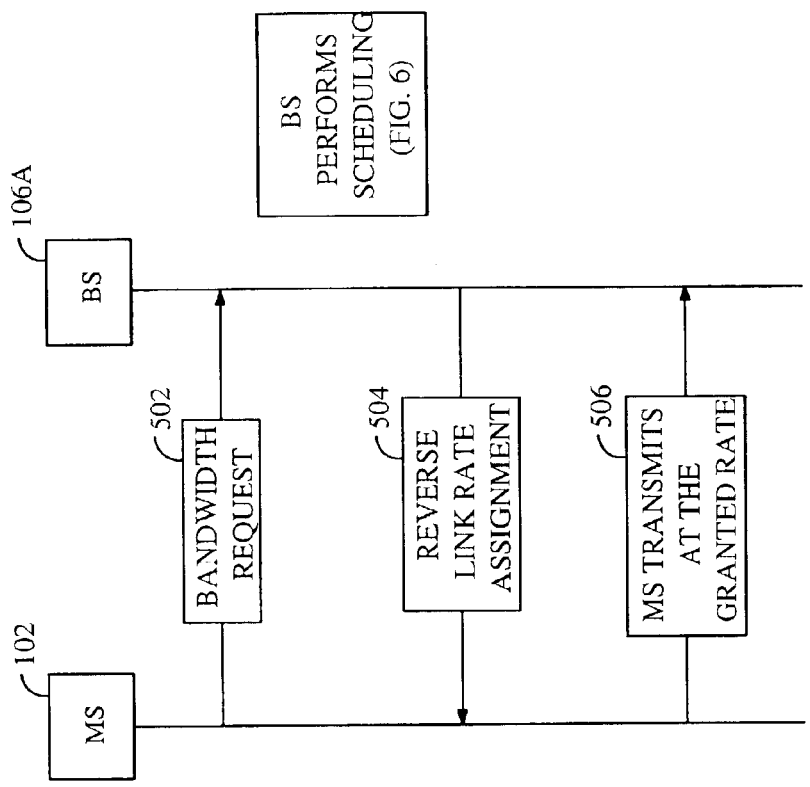
FIG. 5 is a call flow diagram showing assigning rates by a base station based on requests from a mobile station.

Referring to the call flow diagram of FIG. 5, an example of a rate assignment performed by a base station is shown. The mobile station 102 provides a bandwidth request message 502 to the base station 106a, whereby the mobile station requests a specified bandwidth in which to transmit certain traffic (e.g., voice or general computer data). In response, the base station 106a performs scheduling under the above-described technique, which is described more fully below with respect to FIG. 6. After performing such scheduling, the base station 106a sends a reverse link rate assignment message 504 to the mobile station 102 directing the mobile station to transmit its data at the assigned rate. In response thereto, the mobile station transmits the data at the assigned rate (shown as block 506).

With data capable of being sent in bursts or packets, the base station 106a may send multiple reverse link rate assignment messages 504 to the mobile station 102. Thus, in response to only the single bandwidth request message 502, the base station 106a can perform several iterations of the scheduling technique and generate several reverse link rate assignment messages 504 in response thereto. In response to each reverse link rate assignment message 504, the mobile station transmits one or more packets based on the most recently received reverse link rate assignment message. Under the IS-95-B standard, no 1-to-1 mapping between bandwidth request messages 502 and reverse link rate assignment messages 504 exists. Indeed, the base station 106a may send no assignment message at all under this standard.

Figure 6:
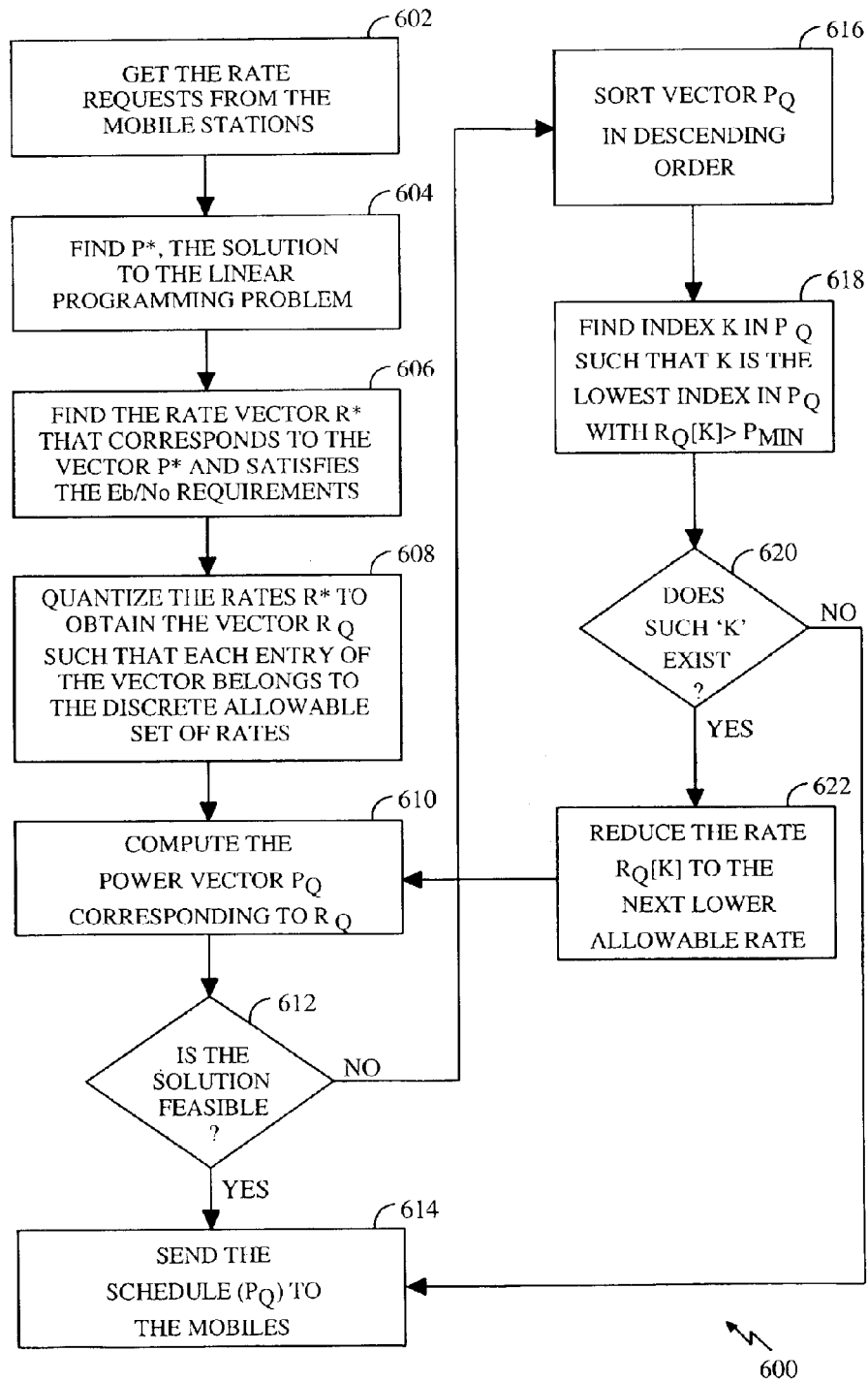
FIG. 6 is a flow diagram showing an example of a routine employed by the base station of FIG. 4 in assigning rates optimally to mobile stations.

Referring to FIG. 6, the scheduling routine applying the above techniques is shown in greater detail as a general routine 600. The routine 600, in the following example, is performed by the base station 106a as it assigns rates to mobile stations, including the mobile station 102. Those skilled in the relevant art can create source code based on the flow chart of FIG. 6 and the detailed description provided herein.

The routine 600 begins in step 602, where the base station 106a receives rate request or bandwidth request messages from the mobile stations. In step 604, the base station 106a solves the linear programming problem (5) above to determine a value for the vector P*, based on the criteria (2) through (4). The base station employs, e.g., a conventional simplex method for solving such problem.

In step 606, the base station 106a finds a rate vector R* that corresponds to the power vector P*, and that also satisfies the $E_b/N_0$ requirements through the following relationship:

$$R_i = \frac{W h_i P_i}{\left(\sum_{j \neq i} h_i P_j + N_0 W\right) \gamma_i}, i = 1, \cdots, N \quad (21)$$

The N×N matrices (9) and (10) above include the value $\gamma_i$ which corresponds to the $E_b/I_o$ value for the $i^{th}$ mobile station. To account for maximum rise over thermal issues, the base station 106a may also include the following criteria in its optimization under (5):

$$\frac{\sum_{i=1}^{N} P_{ij} h_{ij} + I_{OC} + N_0 W}{N_0 W} \leq \text{maximum rise over thermal} \quad (22)$$

In step 608, the base station 106a quantizes the rates R* to obtain a quantized vector $R_Q$ such that each entry of the vector $R_Q$ belongs to a discrete allowable set of rates. As noted above, the system 100 includes a discrete set of rates, ranging from a low rate for voice service to high rates for data services (e.g., video). Therefore, in step 608, the base station 106a identifies rates in the quantized set of rates that most closely correspond to the rates in the vector R*. If the mobile station 102 requires a minimum rate, then the base station 106a identifies the next higher quantized rate, even if a quantized rate exists that is closer to, but lower than, the computed rate.

In step 610, the base station 106a computes a quantized power vector $P_Q$ corresponding to the quantized rate vector $R_Q$ using the following relationship:

$$A P_Q = N_0 W \mathbf{1} \quad (23)$$

where $$A = \begin{bmatrix} \frac{W h_1}{R_{Q\gamma_1}} & -h_2 & \cdots & -h_N \\ -h_1 & \frac{W h_2}{R_{Q\gamma_2}} & \cdots & -h_N \\ \vdots & \vdots & \vdots & \vdots \\ -h_1 & -h_2 & \cdots & \frac{W h_N}{R_{Q\gamma_N}} \end{bmatrix} \quad (24)$$

In step 612, the base station 106a determines whether the computed quantized power and rate vectors $P_Q$ and $R_Q$ provide a feasible solution. If so, then in step 614, the base station 106a sends the schedule of rates to the mobile stations as the quantized rate vector $R_Q$. For example, the base station 106a transmits the reverse link rate assignment 504 to the mobile station 102, which identifies the particular rate at which the mobile station 102 is to transmit.

If this solution is not feasible under step 612, then the base station 106a in step 616 sorts the vectors in the quantized power vector $P_Q$ in descending order. In step 618, the base station 106a finds an index k in the quantized power vector $P_Q$ such that k is the lowest index in the vector $P_Q$ where the rate corresponding to the index k is greater than the minimum rate $R_{min}$, i.e.:

$$R_Q[k] > R_{min} \quad (25)$$

In step 620, the base station 106a determines whether such an index k exists. If so, then in step 622, the base station 106a reduces the rate for the next k to the next lower allowable rate (i.e., reduces the rate $R_Q[k]$=next lower quantized rate). Thereafter, the routine 600 loops back to step 610. If no such index k exists in step 620, the base station 106a sends the previously computed schedule of quantized rates $R_Q$ to the mobile stations.

As can be seen under the optimization problem (13) above, if the mobile station 102 is close to the base station 106a, its channel gain is large, and therefore the weight of the power value P for this mobile station is high. Conversely, if the mobile station 102 is far from the base station 106a in the cell, then its channel gain is small and the weight of its value P is low. Therefore, the optimization routine automatically assigns higher powers P to the mobile stations that are closer to the base station as the base station optimizes (13). Since rate is proportional to power under equation (21), the closer the mobile station is to the base station, the higher power P it has, and therefore, it receives a higher rate R.

As the base station 106a optimizes the rates (and thus powers) for its mobile stations, the base station 106b, and other base stations, similarly optimize rates for their mobile stations. During such optimizations, as shown above, each base station takes into consideration interference generated by neighboring base stations. Under the above technique, while each base station performs rate assignment optimally, independently of other base stations, the base stations continuously modify their reverse link rate assignments based on other-cell-interference and rates requests from the mobile stations. Under the invention, the base stations converge to a stable condition with uncoordinated optimizations (i.e., without a central processing system). While the system 100 is generally described above as performing such optimization synchronously between cells, such optimization may be performed asynchronously.

Under the illustrated embodiment of the invention, the distributed reverse link rate assignment technique optimally assigns reverse link rates within each cell, while also maintaining interference to other cells at a minimum level. The optimization technique maximizes the total throughput in each cell (maximizing rates) subject to a set of constraints, including: mobile station's maximum transmit power, mobile station's requested rate, a discrete set of possible rates, maximum rise-over-thermal interference at the base station, and a minimum required received error per bit normalized for noise ($E_b/N_o$).

Although specific embodiments of, and examples for, the invention are described herein for illustrative purposes, various equivalent modifications can be made without departing from the scope of the invention, as will be recognized by those skilled in the relevant art. For example, embodiments are generally shown and described as being implemented in software and performed by a processor. Such software can be stored on any suitable computer-readable medium, such as micro code stored in a semiconductor chip, as computer-readable disk, or downloaded and stored from a server. The invention could equally be implemented in hardware, such as by a digital signal processor (DSP) or Application Specific Integrated Circuit (ASIC).

The teachings provided herein of the invention can be applied to other communication systems, not necessarily the exemplary communication system described above. For example, while the present invention has been generally described above as being employed in the CDMA communication system 100, the present invention is equally applicable to other digital or analog cellular communication systems. While the base station 106a is described above as optimizing and allocating resources, such techniques can be applied to a user station. The invention can also be modified to employ aspects of the systems, circuits and concepts of the various patents, articles and standards described above, all of which are incorporated by reference.

These and other changes can be made to the invention in light of the above detailed description. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. A method for allocating resources in a communication system having a plurality of base stations each serving multiple user stations, the method comprising:

receiving, at a first base station, service requests from a plurality of user stations;

determining, at a first base station, interference generated by other base stations;

dynamically allocating resources at the first base station including assigning a transmission rate for transmission of information between the first base station and each user station independently of allocation of resources performed by other base stations, based on a set of criteria including a set of requirements associated with each service request and the determined interference generated by other base stations in the communication system, wherein the transmission rate assigned to each user station is determined to optimize a sum of all transmission rates assigned by the first base station to the plurality of user stations based on the set of requirements associated with each service request and wherein higher transmission rates are assigned to user stations which are relatively closer to the first base station;

transmitting rate assignment information from the first base station to the plurality of user stations; and iteratively modifying rate assignments based on the received service requests and the determined interference from other base stations.

2. The method of claim 1 further comprising:

transmitting information from each user station to the first base station in accordance with a transmission rate assigned by the first base station to the respective user station.

3. The method of claim 1 wherein the set of criteria includes a criterion corresponding to the respective user station's requested rate.

4. The method of claim 1 wherein the set of criteria includes a criterion corresponding to the respective user station's maximum transmit power.

5. The method of claim 1 wherein the set of criteria includes a criterion corresponding to a discrete set of transmission rates available for transmission of information from the respective user station to the first base station.

6. The method of claim 1 wherein the set of criteria includes a criterion corresponding to a minimum required error rate of the first base station.

7. The method of claim 1 wherein the set of criteria includes a criterion corresponding to a maximum rise-over-thermal interference at the first base station.

8. The method of claim 1 wherein dynamic allocation of resources is performed synchronously between various base stations in the communication system.

9. The method of claim 1 wherein dynamical allocation of resources is performed asynchronously between various base stations in the communication system.

10. A base station in a communication system, comprising:

a receiver to receive service requests from a plurality of user stations;

a processor to determine interference generated by other base stations and dynamically allocate resources including assigning a transmission rate for transmission of information between the base station and each user station independently of allocation of resources performed by other base stations, based on a set of criteria including a set of requirements associated with each service request and the determined interference generated by other base stations in the communication system, wherein the transmission rate assigned to each user station is determined to optimize a sum of all transmission rates assigned by the base station to the plurality of user stations based on the set of requirements associated with each service requests, and wherein higher transmission rates are assigned to user stations which are relatively closer to the base station, the processor iteratively modifying rate assignments based on the received service requests and the determined interference from other base stations; and a transmitter to transmit rate assignment information from the base station to the plurality of user stations.

11. The base station of claim 10, wherein the set of criteria includes a criterion corresponding to the respective user station's requested rate.

12. The base station of claim 10, wherein the set of criteria includes a criterion corresponding to the respective user station's maximum transmit power.

13. The base station of claim 10, wherein the set of criteria includes a criterion corresponding to a discrete set of transmission rates available for transmission of information from the respective user station to the first base station.

14. The base station of claim 10, wherein the set of criteria includes a criterion corresponding to a minimum required error rate.

15. The base station of claim 10, wherein the set of criteria includes a criterion corresponding to a maximum rise-over-thermal interference at the first base station.

16. The base station of claim 10, wherein dynamic allocation of resources is performed synchronously between various base stations in the communication system.

17. The base station of claim 10, wherein dynamical allocation of resources is performed asynchronously between various base stations in the communication system.

18. In a communication system having a plurality of base stations each serving multiple user stations, an apparatus comprising:

means for receiving, at a first base station, service requests from a plurality of user stations;

means for determining, at a first base station, interference generated by other base stations;

means for dynamically allocating resources at the first base station including assigning a transmission rate for transmission of information between the first base station and each user station independently of allocation of resources performed by other base stations, based on a set of criteria including a set of requirements associated with each service request and the determined interference generated by other base stations in the communication network, wherein the transmission rate assigned to each user station is determined to optimize a sum of all transmission rates assigned by the first base station to the plurality of user stations based on the set of requirements associated with each service request and wherein higher transmission rates are assigned to user stations which are relatively closer to the first base station;

means for transmitting rate assignment information from the first base station to the plurality of user stations; and means for iteratively modifying rate assignments based on the received service requests and the determined interference from other base stations.

19. The apparatus of claim 18 further comprising:

means for transmitting information from each user station to the first base station in accordance with a transmission rate assigned by the first base station to the respective user station.

20. The apparatus of claim 18 wherein the set of criteria includes a criterion corresponding to the respective user station's requested rate.

21. The apparatus of claim 18 wherein the set of criteria includes a criterion corresponding to the respective user station's maximum transmit power.

22. The apparatus of claim 18 wherein the set of criteria includes a criterion corresponding to a discrete set of transmission rates available for transmission of information from the respective user station to the first base station.

23. The apparatus of claim 18 wherein the set of criteria includes a criterion corresponding to a minimum required error rate.

24. The apparatus of claim 18 wherein the set of criteria includes a criterion corresponding to a maximum rise-over-thermal interference at the first base station.

25. The apparatus of claim 18 wherein means for dynamically allocating resources comprises:

means for iteratively modifying rate assignments based on the received service requests and interference from other base stations.

* * * * *